United States Patent
Morrissey et al.

(10) Patent No.: US 6,887,600 B2
(45) Date of Patent: May 3, 2005

(54) REGENERATIVE FUEL CELL WITH PH CONTROL

(75) Inventors: Patrick John Morrissey, Uxbridge (GB); Norman John Ward, Stanford-in-the-Vale (GB)

(73) Assignee: Regenesys Technologies Limited, Wilts (GB)

( * ) Notice: Subject to any disclaimer, the term of this patent is extended or adjusted under 35 U.S.C. 154(b) by 19 days.

(21) Appl. No.: 10/475,139

(22) PCT Filed: Apr. 16, 2002

(86) PCT No.: PCT/GB02/01754

§ 371 (c)(1), (2), (4) Date: Oct. 17, 2003

(87) PCT Pub. No.: WO02/086998

PCT Pub. Date: Oct. 31, 2002

(65) Prior Publication Data

US 2004/0151977 A1 Aug. 5, 2004

(30) Foreign Application Priority Data

Apr. 20, 2001 (GB) .............................. 0109824

(51) Int. Cl.$^7$ ................................ H01M 8/18
(52) U.S. Cl. .............................. 429/14; 429/15; 429/51; 429/72; 429/105
(58) Field of Search ............................... 429/14, 15, 51, 429/72, 105

(56) References Cited

U.S. PATENT DOCUMENTS 4,485,154 A * 11/1984 Remick et al. ............... 429/14
5,612,148 A * 3/1997 Zito ............................ 429/15
6,461,495 B1 * 10/2002 Morrissey et al. .......... 205/687

FOREIGN PATENT DOCUMENTS

| WO | WO-94/09522 | * | 4/1994 |
| WO | WO-00/03448 | * | 1/2000 |

* cited by examiner

Primary Examiner—John S. Maples
(74) Attorney, Agent, or Firm—Antonelli, Terry, Stout & Krauss, LLP (57) ABSTRACT

The present invention relates to a process for operating a regenerative fuel cell (RFC). The process involves circulating a first electrolyte (electrolyte 1) through the negative chamber of the cell and a second electrolyte (electrolyte 2) through the positive chamber of the cell. Electrolyte (1) contains sulfide during the discharge cycle of the cell. Electrolyte (2) contains bromine during the discharge cycle of the cell. Decreases in ph in the electrolyte are compensated by circulating a fraction of other electrolyte (1) or (2) through the positive chamber of an auxiliary cell. A fraction of electrolyte (2), which has been made free of bromine, is circulated in the negative chamber of the auxiliary cell.

5 Claims, 8 Drawing Sheets

REGENERATIVE FUEL CELL WITH PH CONTROL

The present invention relates to the field of regenerative fuel cell (RFC) technology. In particular it relates to apparatus and methods for the operation of RFCs which enhance their performance characteristics.

The manner in which RFCs are able to store and deliver electricity is well known to those skilled in the art. An example of an RFC is described in U.S. Pat. No. 4,485,154 which discloses an electrically chargeable, anionically active, reduction-oxidation system using a sulfide/polysulfide reaction in one half of the cell and an iodine/iodide, chlorine/chloride or bromine/bromide reaction in the other half of the cell. The two halves of the cell are separated by a cation exchange membrane.

The overall chemical reaction involved, for example, for the bromine/bromide-sulfide/polysulfide system is shown in Equation 1 below:

$$Br_2 + S^{2-} \rightleftharpoons 2Br^- + S \qquad \text{Equation 1}$$

Within an RFC such as that described in U.S. Pat. No. 4,485,154, the reaction takes place in separate but dependent bromine and sulfur half-cell reactions as shown below in Equations 2 and 3:

$$Br_2 + 2e^- \rightleftharpoons 2Br^- \qquad \text{Equation 2}$$

$$S^{2-} \rightleftharpoons 2e^- + S \qquad \text{Equation 3}$$

It should be noted however that these equations represent the overall reactive changes occurring in the RFC. In practice the reactions are complicated by the low basicity of sulfide which results in the formation of bisulfide as the active species, as shown in Equation 4.

$$S^{2-} + H_2O \rightleftharpoons HS^- + OH^- \qquad \text{Equation 4}$$

Also, the sulfur produced in Equations 1 and 3 forms soluble polysulfide species in the presence of sulfide ions, as shown in Equation 5 (where x may be from 1 to 4).

$$S^{2-} + xS \rightleftharpoons S_{x+1}^{2-} \qquad \text{Equation 5}$$

Also, free bromine is solubilised in the presence of bromide ions to form the tribromide ion, as shown in Equation 6.

$$Br^- + Br_2 \rightleftharpoons Br_3^- \qquad \text{Equation 6}$$

When the RFC is discharging, bromine is converted to bromide on the positive ($+^{ve}$) side of the membrane and sulfide is converted to polysulfide on the negative ($-^{ve}$) side of the membrane. Equation 1 goes from left to right and metal ions flow from the $-^{ve}$ side of the membrane to the $+^{ve}$ side of the membrane to complete the circuit. When the RFC is charging, bromide is converted to bromine on the $+^{ve}$ side of the membrane and polysulfide is converted to sulfide on the $-^{ve}$ side of the membrane. Equation 1 goes from right to left and metal ions flow from the $+^{ve}$ side of the membrane to the $-^{ve}$ side of the membrane to complete the circuit.

A disadvantage of the system described above is that during operation the pH of the bromine/bromide electrolyte falls. This results in H$^+$ ions being transported across the cation exchange membrane into the sulfide/polysulfide electrolyte reducing the pH and thus reducing the solubility of the sulfide/polysulfide species. This results in a decrease in the performance of the RFC.

The decrease in pH occurs in the bromine electrolyte as a result of the transport of bisulfide anions through the membrane and subsequent reaction with bromine as shown in Equation 7. Protons then transport through the membrane due to the increased pH differential from the low pH bromine/bromide electrolyte to the high pH sulfide/polysulfide electrolyte.

$$SH^- + 4Br_2 + 4H_2O \rightarrow SO_4^{2-} + 8Br^- + 9H^+ \qquad \text{Equation 7}$$

WO94/09522 describes processes and apparatus which can be used to compensate for the decrease in pH in the bromine/bromide electrolyte. In a preferred embodiment it describes the incorporation in the bromine/bromide electrolyte stream of a pH compensation cell in which $Br_2$ is generated at the $+^{ve}$ electrode and $H_2$ is generated at the $-^{ve}$ electrode thereby reducing the concentration of H$^+$ ions and restoring the pH of the electrolyte.

Although the solution disclosed in WO94/09522 provides an adequate method for pH compensation, it would be advantageous to provide further processes for controlling pH in an RFC such as that decribed above.

Accordingly, the present invention provides an electrochemical process for energy storage and/or power delivery comprising:

(i) maintaining and circulating electrolyte flows in a liquid system in which the active constituents are soluble in a single cell or in an array of repeating cell structures, each cell with a positive ($+^{ve}$) chamber containing a $+^{ve}$ electrode and a negative ($-^{ve}$) chamber containing a $-^{ve}$ electrode, the chambers being separated from one another by a cation exchange membrane, the electrolyte circulating in the $-^{ve}$ chamber of each cell during discharge containing sulfide (electrolyte 1), and the electrolyte circulating in the $+^{ve}$ chamber during discharge containing bromine (electrolyte 2), (ii) restoring or replenishing the electrolytes in the $+^{ve}$ and $-^{ve}$ chambers by circulating the electrolyte from each chamber to storage means comprising a volume of electrolyte greater than the cell volume for extended delivery of power over a longer discharge cycle than the cell volume alone would permit, and (iii) compensating for pH decreases in the electrolytes by (a) circulating a fraction of electrolyte 1 or 2 through the $+^{ve}$ chamber of an auxiliary cell, said auxiliary cell comprising a $+^{ve}$ chamber containing a $+^{ve}$ electrode and a $-^{ve}$ chamber containing a $-^{ve}$ electrode, the chambers being separated from one another by a cation exchange membrane, the electrolyte circulating through the $-^{ve}$ chamber of the auxiliary cell being a fraction of electrolyte 2 which has been made free of bromine by electrochemial-reduction thereof, the auxiliary cell operating so as to oxidise sulfide ions to sulfur (where a fraction of electrolyte 1 is circulated through the $+^{ve}$ chamber) or bromide ions to bromine (where a fraction of electrolyte 2 is circulated through the $+^{ve}$ chamber) in the $+^{ve}$ chamber and so as to reduce water present in electrolyte 2 to hydrogen and hydroxide ions in the $-^{ve}$ chamber and (b) transferring at least a portion of electrolyte 2 which exits the $-^{ve}$ chamber of the auxiliary cell into electrolyte 1.

The present invention also includes within its scope apparatus for carrying out a process as described above comprising:

(i) a single cell or an array of repeating cell structures, each cell comprising; a $+^{ve}$ chamber containing a $+^{ve}$ electrode and a $-^{ve}$ chamber containing a $-^{ve}$ electrode the chambers being separated from one another by an ion exchange membrane, an electrolyte circulating in the $-^{ve}$ chamber of each cell which contains sulfide during discharge (electrolyte 1), and an electrolyte circulating in the $+^{ve}$ chamber which contains bromine during discharge (electrolyte 2), (ii) storage and circulation means for each electrolyte for restoring or replenishing the electrolytes in the $+^{ve}$ and $-^{ve}$ chambers, (iii) means for compensating for pH decreases in the electrolytes comprising; (a) an auxiliary cell which comprises a $+^{ve}$ chamber containing a $+^{ve}$ electrode and a $-^{ve}$ chamber containing an $-^{ve}$ electrode the chambers being separated from one another by a cation exchange membrane, means for circulating a fraction of electrolyte 1 or 2 through the $+^{ve}$ chamber of the auxiliary cell, means for circulating a fraction of electrolyte 2 which has been made free of bromine by electrochemial reduction thereof through the $-^{ve}$ chamber of the auxiliary cell and (b) means for transferring at least a portion of electrolyte 2 which exits the $-^{ve}$ chamber of the auxiliary cell into electrolyte 1.

The reduction of water to hydrogen and hydroxide ions in the $-^{ve}$ chamber of the auxiliary cell proceeds according to the half-cell reaction shown in Equation 8 below:

$$2H_2O + 2e^- \leftrightarrows H_2 + 2OH^- \qquad \text{Equation 8}$$

In carrying out the process of the present invention the electrolyte circulating through the $-^{ve}$ chamber of the auxiliary cell is a fraction of electrolyte 2 which has been made free of bromine by electrochemical reduction thereof. This may be achieved by recirculating electrolyte 2 which still contains bromine through the $-^{ve}$ chamber of the auxiliary cell until all of the bromine has been reduced to bromide. Once all of the bromine has been reduced the cell then begins to reduce water to hydrogen and hydroxide. The electrolyte exiting the $-^{ve}$ chamber of the auxiliary cell may then be transferred to electrolyte 1 once sufficient hydroxide ions have been generated therein.

In an alternative manner of carrying out the process of the present invention, the electrochemical reduction of any residual bromine in electrolyte 2 occurs within the $-^{ve}$ chamber of a second auxiliary cell which comprises a $+^{ve}$ chamber containing an inert $+^{ve}$ electrode and a $-^{ve}$ chamber containing an inert $-^{ve}$ electrode, the chambers being separated from one another by a cation exchange membrane, the electrolyte circulating through the $+^{ve}$ chamber being a fraction of electrolyte 1 or 2. In this embodiment, the electrochemical reduction of residual bromine is preferably effected by recirculating the fraction of electrolyte 2 through the $-^{ve}$ chamber of the second auxiliary cell until all of the bromine has been reduced.

BRIEF DESCRIPTION OF THE DRAWINGS

The present invention will be further described with reference to the accompanying drawings in which.

Figure 1A:
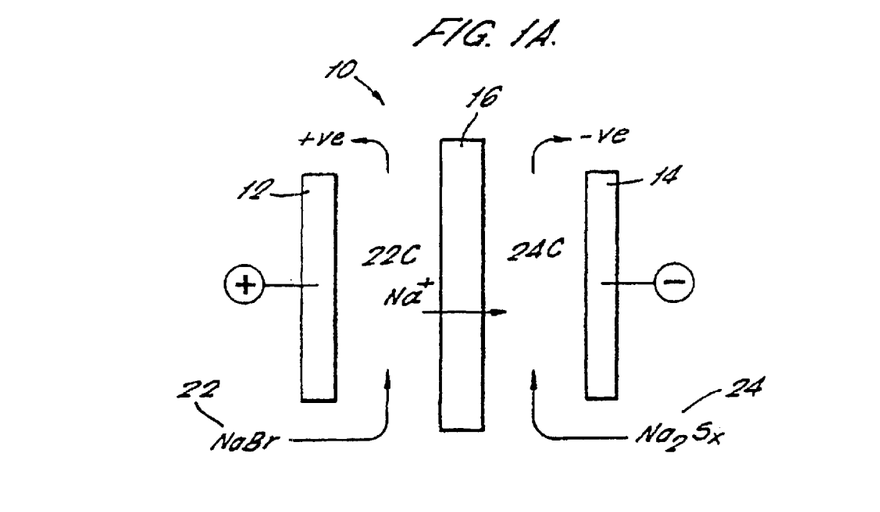
FIG. 1A is a schematic view of a basic electrochemical reduction-oxidation cell in which a sulfide/polysulfide reaction is carried out in one half of the cell and a bromine/bromide reaction is carried out in the other half of the cell.

FIG. 1A shows a cell 10 with a positive ($+^{ve}$) electrode 12 and a negative ($-^{ve}$) electrode 14 and a cation exchange membrane 16 which may be formed from a fluorocarbon polymer with sulfonic acid functional groups to provide charge carriers. The membrane 16 acts to separate the $+^{ve}$ and $-^{ve}$ sides of the cell 10 and is selected to minimize migration of bromine from the $+^{ve}$ side to the $-^{ve}$ side and to minimize migration of sulfide and polysulfide ions from the $-^{ve}$ side to the $+^{ve}$ side. An aqueous solution 22 of NaBr is provided in a chamber 22C formed between the $+^{ve}$ electrode 12 and the membrane 16 and an aqueous solution 24 of $Na_2S_x$ (where x may be from 2 to 5) is provided in a chamber 24C formed between the $-^{ve}$ electrode 14 and the membrane 16. A $K_2S_x$ solution, which is more soluble and more expensive than the $Na_2S_x$ solutions, is used in another embodiment.

When the cell is in the discharged state, a solution of NaBr of up to 6.0 molar concentration exists in the chamber 22C of the cell and a solution of $Na_2S_x$ at 0.5 to 1.5 molar, exists in chamber 24C of the cell. Higher molarity is possible with $K_2S_x$.

As the cell is charged, $Na^+$ ions are transported through the cation membrane 16, as shown in FIG. 1A, from the $+^{ve}$ to the $-^{ve}$ side of the cell. Free bromine is produced via oxidation of the bromide ions at the $+^{ve}$ electrode and dissolves as a tribromide or pentabromide ion. Sulfur is reduced at the $-^{ve}$ electrode and the polysulfide, $Na_2S_x$, salt eventually becomes the monosulfide as the charging process/cycle proceeds to completion. At the $+^{ve}$ side the following reaction occurs, $$2Br^- \rightarrow Br_2 + 2e^-$$

and at the $-^{ve}$ side the following reaction occurs, $$S + 2e^- \rightarrow S^{2-}.$$

The membrane separates the two electrolytes and prevents bulk mixing and also retards the migration of sulfide and polysulfide ions from the $-^{ve}$ side to the $+^{ve}$ side, and the migration of $Br^-$ and $Br_2$ from the $+^{ve}$ to the $-^{ve}$ side. Diffusion of the sulfide and polysulfide ions across the membrane results in coulombic losses.

When providing power, the cell is discharging. During this action, reversible reactions occur at the two electrodes. At the $+^{ve}$ side electrode 12, bromine is reduced to $Br^-$, and at the $-^{ve}$ electrode, the $S^{2-}$ ion is oxidized to molecular S. The electrons produced at the $-^{ve}$ electrode form the current through a load. The chemical reaction at the $+^{ve}$ electrode produces 1.06 to 1.09 volts and the chemical reaction at the $-^{ve}$ electrode produces 0.48 to 0.52 volts. The combined chemical reactions produce an open circuit voltage of 1.54 to 1.61 volts per cell.

The present system is an anionically active electrochemical system. Therefore, the cation which is associated with them essentially takes no part in the energy producing process. Hence, a cation of "convenience" is chosen. Sodium or potassium are preferred choices. Sodium and potassium compounds are plentiful, they are inexpensive and have high water solubilities. Lithium and ammonium salts are also possibilities, but at higher costs.

Figure 1B:
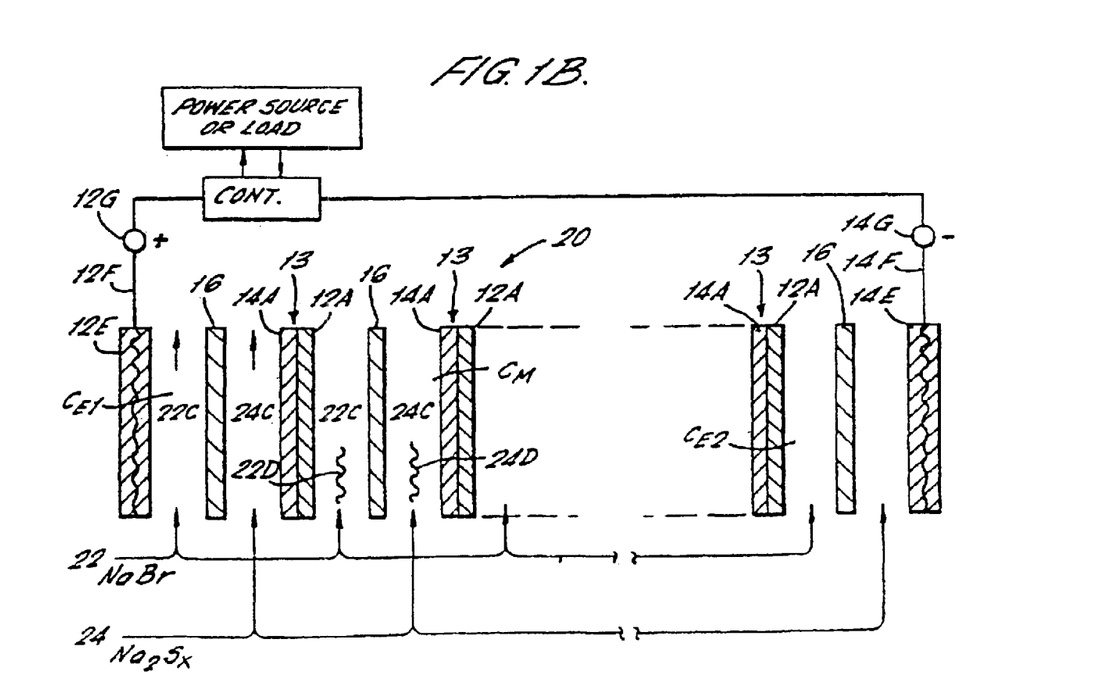
FIG. 1B is a diagram of cell arrays using the system of FIG. 1A.

FIG. 1B shows an array 20 of multiple cells connected in electrical series and fluid parallel. Multiple mid-electrodes 13 (each one having a $+^{ve}$ electrode side 12A and $-^{ve}$ electrode side 14A) and end electrodes 12E ($+^{ve}$) and 14E ($-^{ve}$) are spaced out from each other by membranes 16 and, optionally, screen or mesh spacers (22D, 24D) in all the cell chambers 22C, 24C, (portions of two of which 22D, 24D are shown by way of example) to form end cells $C_{E1}$ and $C_{E2}$ and an array of mid cells $C_M$ (typically 10–20; but note much smaller and much higher numbers of cells can be accommodated). The end electrodes 12E ($+^{ve}$) and 14E ($-^{ve}$) have internal conductors 12F and 14F (typically copper screens) encapsulated therein and leading to external terminals 12G, 14G which are connected to external loads (e.g. to motor(s) via a control circuit (CONT), the motor(s) may be used to drive a vehicle) or power sources (e.g. utility power grid when used as a load-levelling device).

Figure 2:
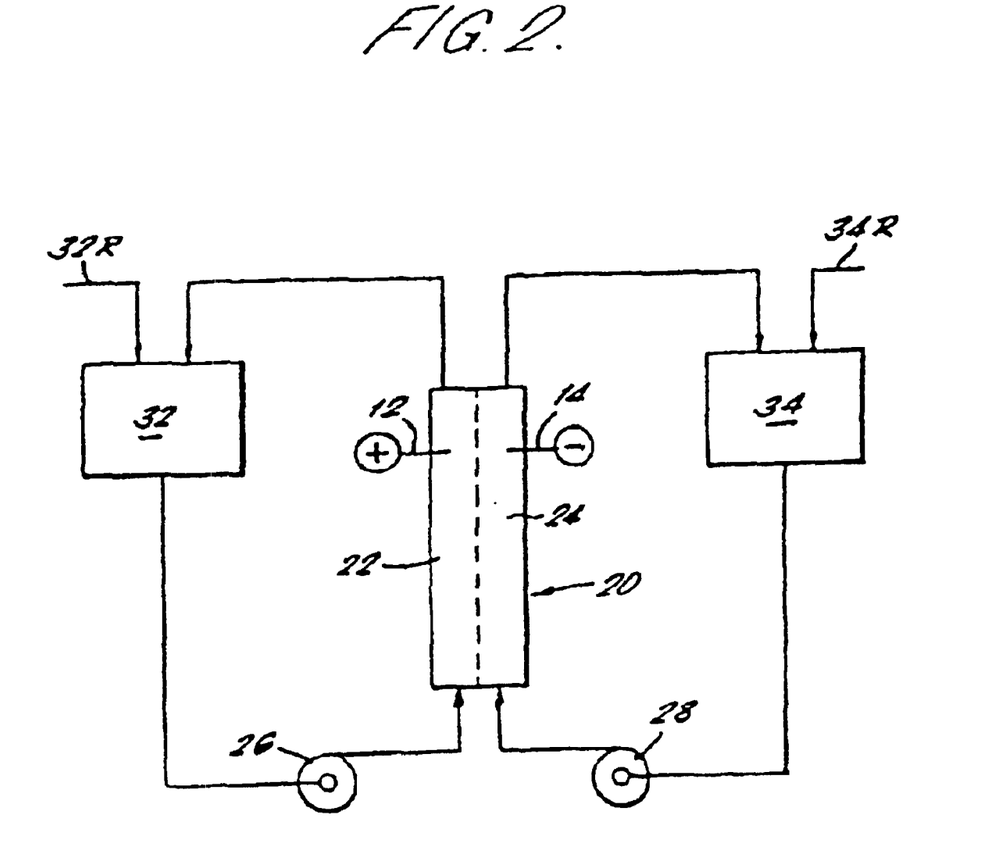
FIG. 2 is a flow diagram of a fluid flow system using the cell of FIG. 1A or cell array of FIG. 1B.

FIG. 2 shows a free flow system, a power generation/storage system utilizing one or more of the batteries or cell array formats 20. Each cell 20 receives electrolyte through pumps 26 and 28 for the NaBr and $Na_2S_x$ solutions (22 and 24, respectively). The electrolytes 22 and 24 are stored in containers 32 and 34. The tanks 32, 34 can be replaced with freshly charged electrolyte by substituting tanks containing fresh electrolyte and/or refilling them from charged supply sources via lines 32R, 34R with corresponding lines (not shown) provided for draining spent (discharged) reagent. The electrolytes 22 and 24 are pumped from tanks 32 and 34, respectively, into the respective chambers 22C and 24C by means of pumps 26 and 28.

Figure 3:
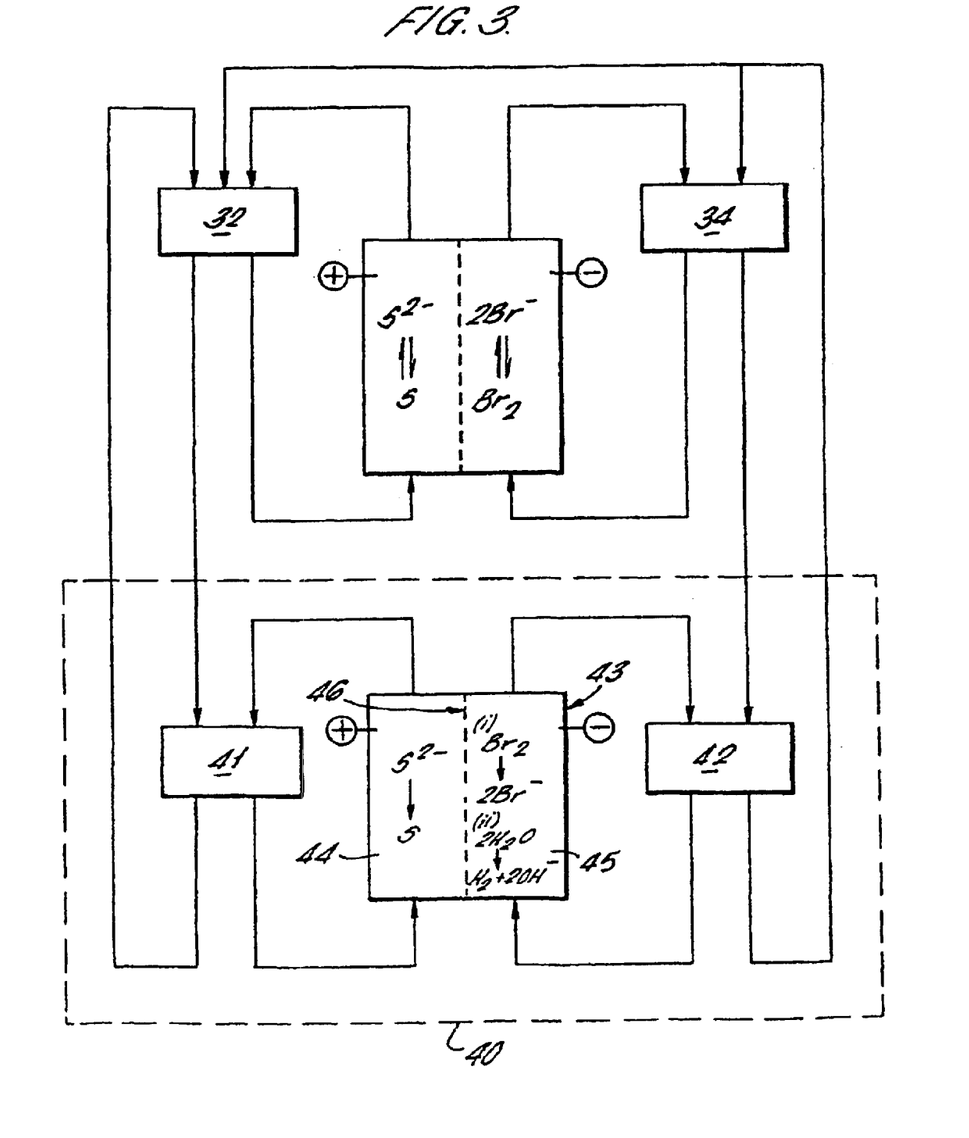
FIGS. 3, 4, 5, 6, 7 and 8 are flow diagrams of apparatus for carrying out the process of the present invention.

FIG. 3 shows a free flow system comprising a power generation/storage system as illustrated in FIG. 2 and a pH compensation system 40. Fractions of the sulfide/polysulfide electrolyte (electrolyte 1) and the bromine/bromide electrolyte (electrolyte 2) are taken from tanks 32 and 34 respectively at a point in the charge/discharge cycle. The electrolyte fractions are passed to tanks 41 and 42. Electrolytes 1 and 2 are then circulated through the $+^{ve}$ and $-^{ve}$ chambers 44 and 45 respectively of an auxiliary cell 43 which is divided by a cation exchange Membrane 46. It will be appreciated by a person skilled in the art that an array of auxiliary cells arranged in series may advantageously be used in this and the other embodiments described herein. In the $+^{ve}$ chamber 44, sulfide ions are oxidised to sulfur. In the $-^{ve}$ chamber 45, two reduction processes may occur. Firstly any residual bromine is reduced to bromide. Secondly water is reduced to hydrogen and hydroxide ions. When sufficient hydroxide has been generated in electrolyte 2, at least a portion thereof is transferred into tank 32, the remainder being returned to tank 34. The oxidised electrolyte 1 is returned to tank 32.

Figure 4:
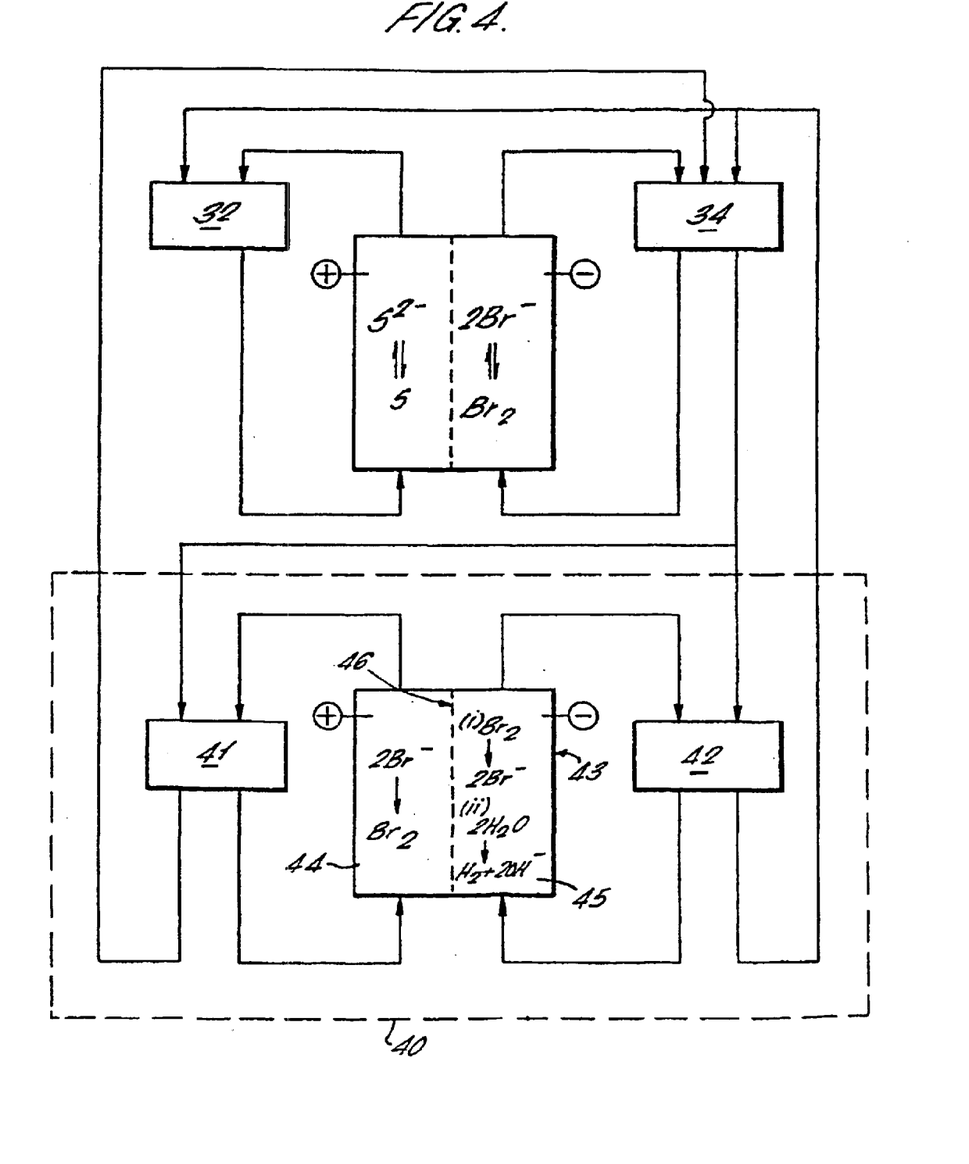

FIG. 4 shows a free flow system comprising a power generation/storage system as illustrated in FIG. 2 and a pH compensation system 40. Fractions of the bromine/bromide electrolyte (electrolyte 2) are taken from tank 34 at a point in the charge/discharge cycle. The electrolyte fractions are passed to tanks 41 and 42. Electrolyte 2 is then circulated through both the $+^{ve}$ and $-^{ve}$ chambers 44 and 45 of an auxiliary cell 43 which is divided by a cation exchange membrane 46. In the $+^{ve}$ chamber 44, bromide ions are oxidised to bromine. In the $-^{ve}$ chamber 45, two reduction processes may occur. Firstly any residual bromine is reduced to bromide. Secondly water is reduced to hydrogen and hydroxide ions. When sufficient hydroxide has been generated in the fraction of electrolyte 2 circulating through the $-^{ve}$ chamber 45, at least a portion thereof is transferred into tank 32, the remainder being returned to tank 34. The oxidised electrolyte 2 is returned to tank 34. This embodiment is preferred over FIG. 3 because it produces charged species in electrolyte 2 (i.e. bromine).

Figure 5:
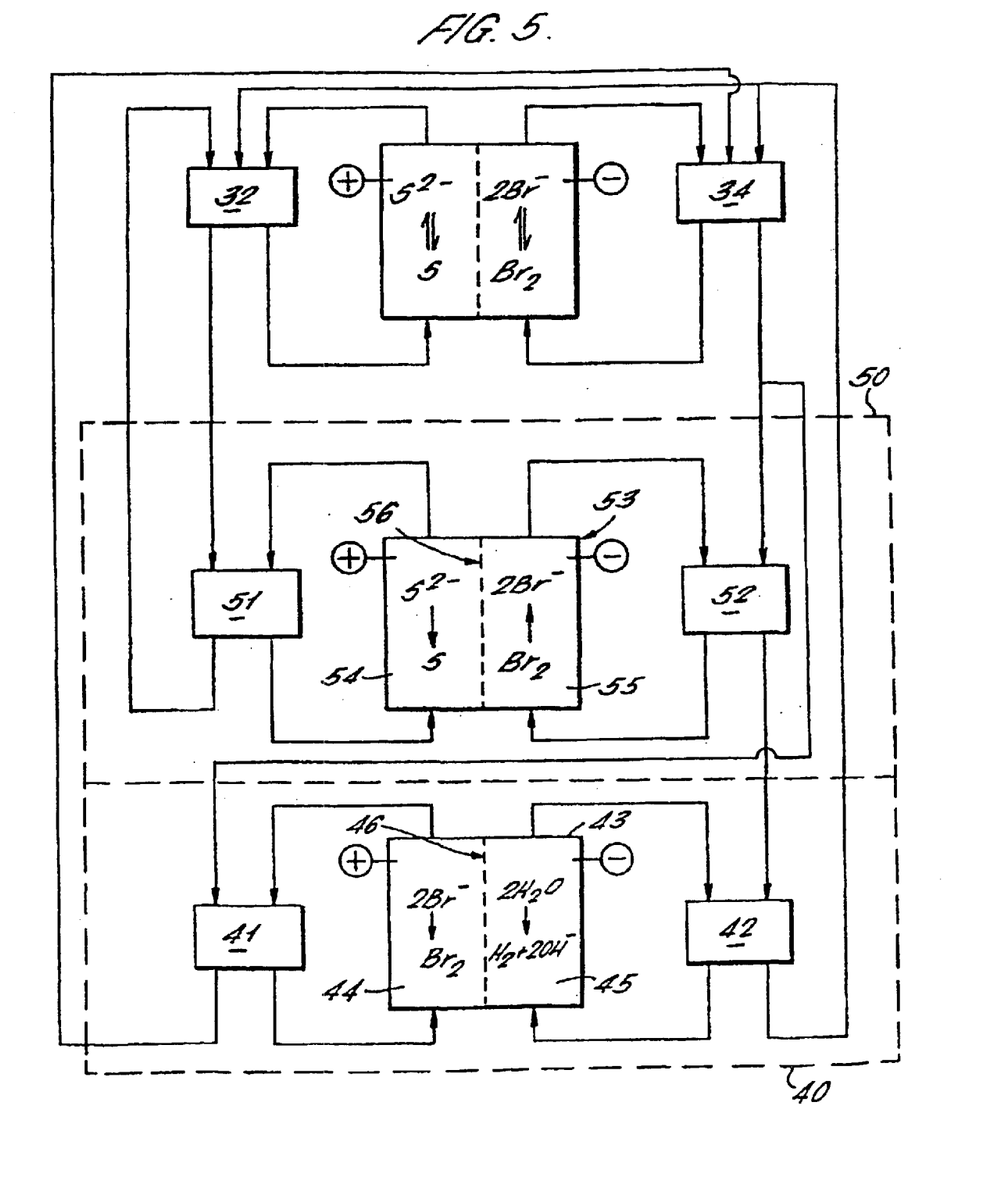

FIG. 5 shows a further modification of FIG. 4 including a separate bromine reduction system 50 in this embodiment, fractions of the sulfide/polysulfide electrolyte (electrolyte 1) and the bromine/bromide electrolyte (electrolyte 2) are taken from tanks 32 and 34 respectively. The electrolytes are passed to tanks 51 and 52. Electrolytes 1 and 2 are then circulated through chambers 54 and 55 respectively of a second auxiliary cell 53 which is divided by a cation exchange membrane 56. The second auxiliary cell 53 comprises electrodes 57 and 58 so that it may function as a cell in the same manner as the cell (or cells) of the main RFC system. Current is passed through the cell 53 so as to completely discharge electrolyte 2 as it circulates through chamber 55 thus removing all residual bromine. Electrolyte 1 is then returned to tank 32 whilst the discharged bromine/bromide electrolyte (electrolyte 2) is taken from tank 52 and passed to tank 42. A fraction of electrolyte 2 from tank 34 is supplied to tank 41. Electrolyte 2 is then circulated through both the $+^{ve}$ and $-^{ve}$ chambers 44 and 45 of an auxiliary cell 43 which is divided by a cation exchange membrane 46. In the $+^{ve}$ chamber 44, bromide ions are oxidised to bromine. In the $-^{ve}$ chamber 45, water is reduced to hydrogen and hydroxide ions. When sufficient hydroxide has been generated in the fraction of electrolyte 2 circulating through the $-^{ve}$ chamber 45, at least a portion thereof is transferred into tank 32, the remainder being returned to tank 34. The oxidised electrolyte 2 is returned to tank 34 from tank 41. This embodiment is preferred over FIG. 4 because it enables the cells 53 and 43 and their $-^{ve}$ electrodes to be optimised for bromine reduction and water reduction respectively rather than having to perform both reduction reactions using the same cell set-up.

Figure 6:
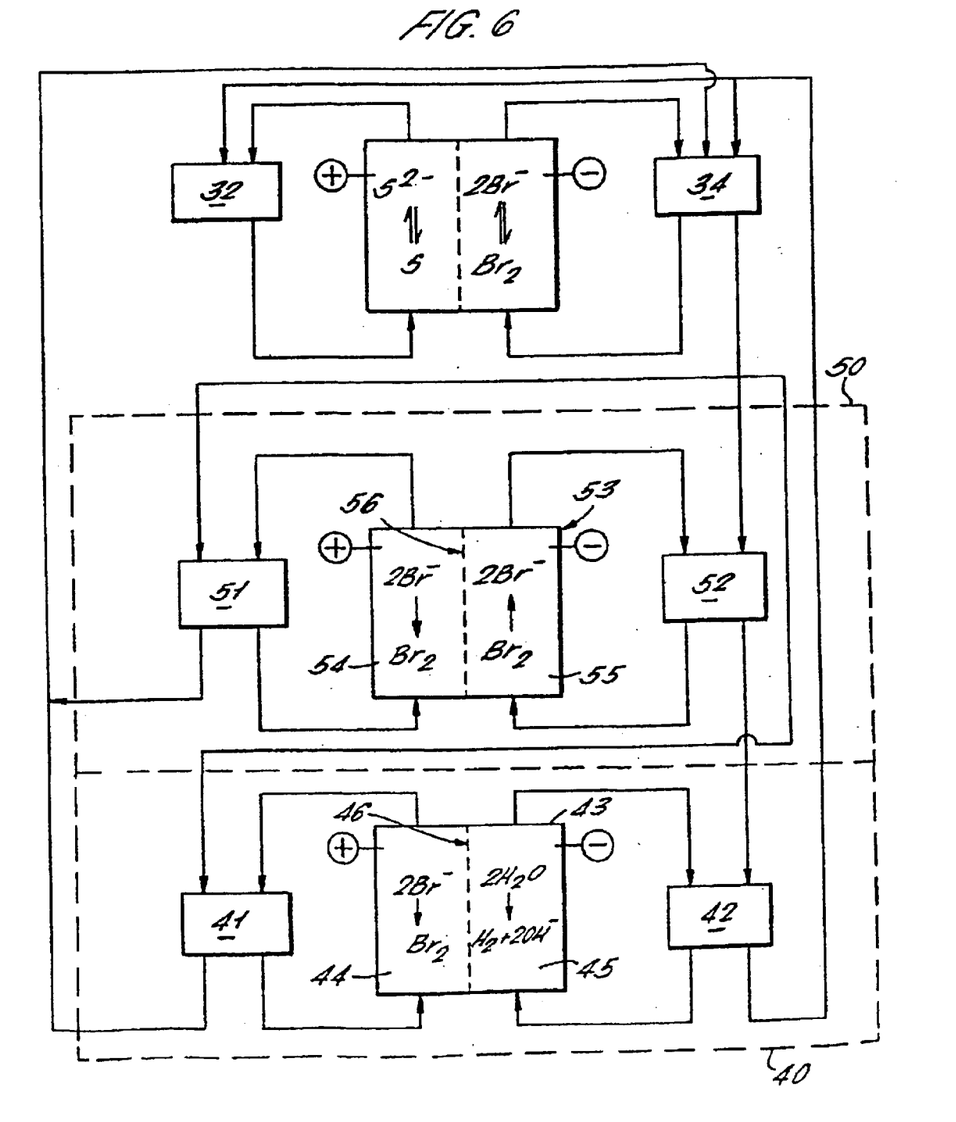
Figure 7:
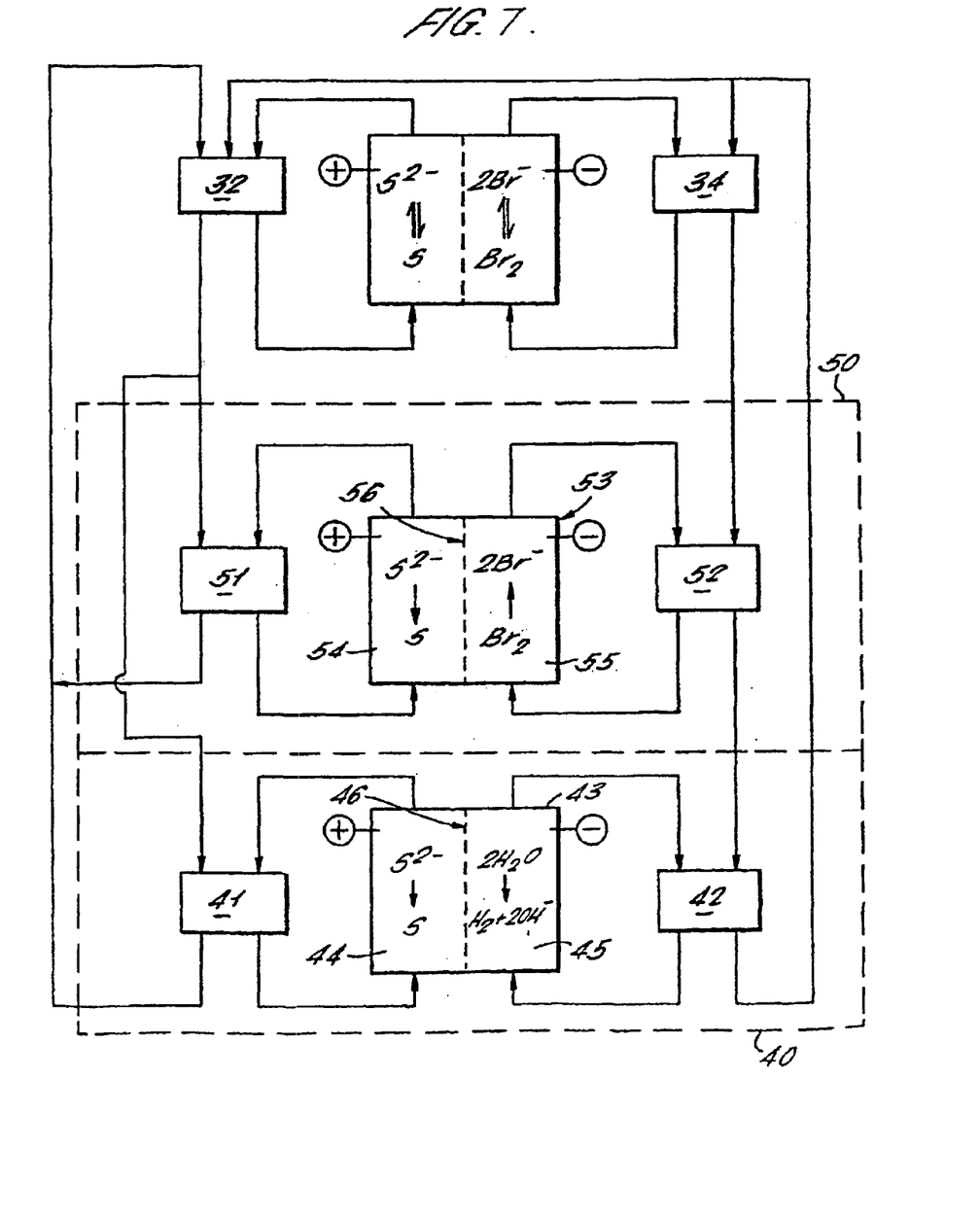
Figure 8:
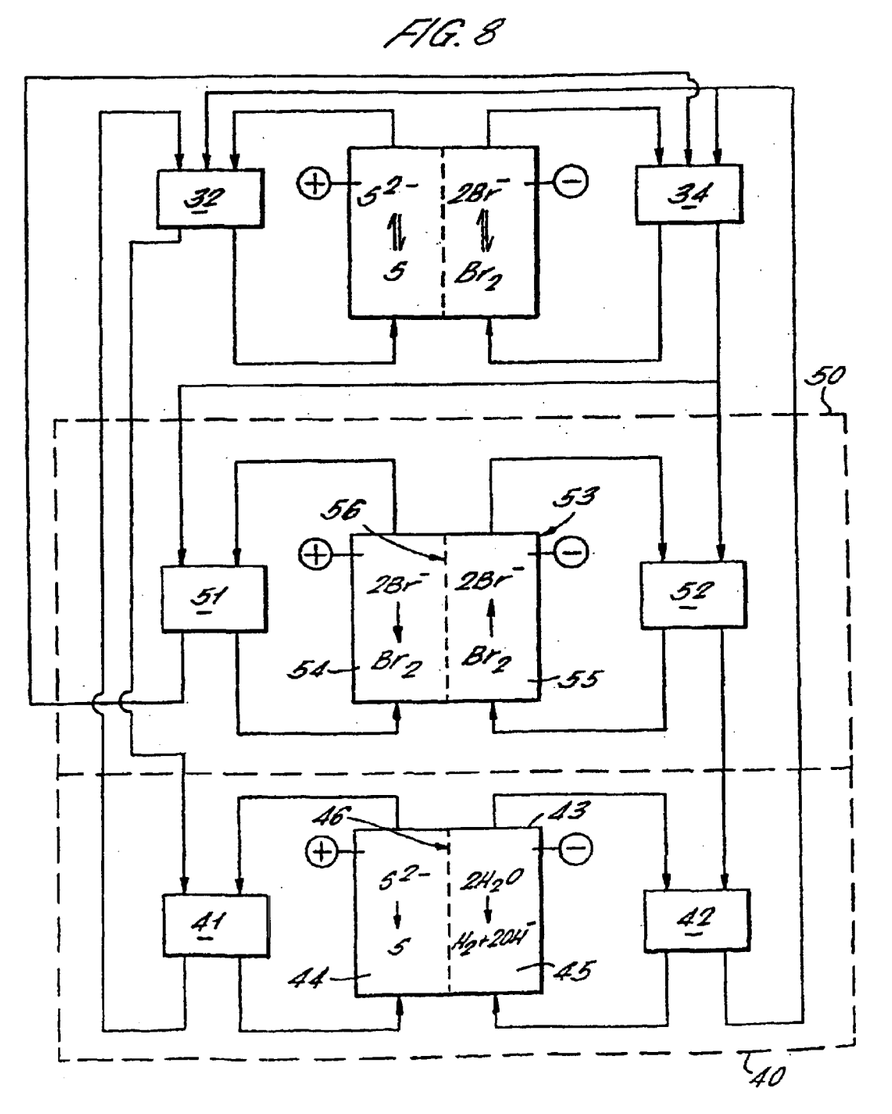

FIGS. 6, 7 and 8 are similar in principle to FIG. 5. They represent three further permutations of the embodiment shown in FIG. 5 wherein the electrolytes which circulate through the $+^{ve}$ chambers (44 and 54) of the first and second auxiliary cells (43 and 53) are varied.

Although not illustrated in FIGS. 3, 4, 5, 6, 7 and 8, hydrogen vents may also be provided at suitable positions to prevent the build up of gas in the system.

It will be appreciated by the person skilled in the art that further embodiments may be described and the present invention is not intended to be limited to those described herein.

What is claimed is:

1. An electrochemical process for energy storage and/or power delivery comprising:
 (i) maintaining and circulating electrolyte flows in a liquid system in which the active constituents are soluble in a single cell or in an array of repeating cell structures, each cell with a positive ($+^{ve}$) chamber containing a $+^{ve}$ electrode and a negative ($-^{ve}$) chamber containing a $-^{ve}$ electrode, the chambers being separated from one another by a cation exchange membrane, the electrolyte circulating in the $-^{ve}$ chamber of each cell during discharge containing sulfide (electrolyte 1), and the electrolyte circulating in the $+^{ve}$ chamber during discharge containing bromine (electrolyte 2),
 (ii) restoring or replenishing the electrolytes in the $+^{ve}$ and $-^{ve}$ chambers by circulating the electrolyte from each chamber to storage means comprising a volume of electrolyte greater than the cell volume for extended delivery of power over a longer discharge cycle than the cell volume alone would permit, and
 (iii) compensating for pH decreases in the electrolytes by
  (a) circulating a fraction of electrolyte 1 or 2 through the $+^{ve}$ chamber of an auxiliary cell, said auxiliary cell comprising a $+^{ve}$ chamber containing a $+^{ve}$ electrode and a $-^{ve}$ chamber containing a $-^{ve}$ electrode, the chambers being separated from one another by a cation exchange membrane, the electrolyte circulating through the $-^{ve}$ chamber of the auxiliary cell being a friction of electrolyte 2 which has been made free of bromine by electrochemical reduction thereof, the auxiliary cell operating so as to oxidise sulfide ions to sulfur (where a fraction of electrolyte 1 is circulated through the $+^{ve}$ chamber) or bromide ions to bromine (where a fraction of electrolyte 2 is circulated through the $+^{ve}$ chamber) in the $+^{ve}$ chamber and so as to reduce water present in electrolyte 2 to hydrogen and hydroxide ions in the $-^{ve}$ chamber and (b) transferring at least a portion of electrolyte 2 which exits the $-^{ve}$ chamber of the auxiliary cell into electrolyte 1.

2. A process as claimed in claim 1 wherein the electrochemical reduction of bromine is effected by recirculating the fraction of electrolyte 2 through the $-^{ve}$ chamber of the auxiliary cell until all of the bromine has been reduced.

3. A process as claimed in claim 1 wherein the electrochemical reduction of bromine occurs within the $-^{ve}$ chamber of a second auxiliary cell which comprises a $+^{ve}$ chamber containing an inert $+^{ve}$ electrode and a $-^{ve}$ chamber containing an inert $-^{ve}$ electrode, the chambers being separated from one another by a cation exchange membrane, the electrolyte circulating through the $+^{ve}$ chamber being a fraction of electrolyte 1 or 2.

4. A process as claimed in claim 3 wherein the electrochemical reduction of bromine is effected by recirculating the fraction of electrolyte 2 through the $-^{ve}$ chamber of the second auxiliary cell until all of the bromine has been reduced.

5. Apparatus for carrying out a process as claimed in any one of the preceding claims comprising:

(i) a single cell or an array of repeating cell structures, each cell comprising; a $+^{ve}$ chamber containing a $+^{ve}$ electrode and a $-^{ve}$ chamber containing a $-^{ve}$ electrode the chambers being separated from one another by an ion exchange membrane, an electrolyte circulating in the $-^{ve}$ chamber of each cell which contains sulfide during discharge (electrolyte 1), and an electrolyte circulating in the $+^{ve}$ chamber which contains bromine during discharge (electrolyte 2), (ii) storage and circulation means for each electrolyte for restoring or replenishing the electrolytes in the $+^{ve}$ and $-^{ve}$ chambers, (iii) means for compensating for pH decreases in the electrolytes comprising; (a) an auxiliary cell which comprises a $+^{ve}$ chamber containing a $+^{ve}$ electrode and a $-^{ve}$ chamber containing an $-^{ve}$ electrode the chambers being separated from one another by a cation exchange membrane, means for circulating a fraction of electrolyte 1 or 2 through the $+^{ve}$ chamber of the auxiliary cell, means for circulating a fraction of electrolyte 2 which has been made free of bromine by electrochemical redution thereof through the $-^{ve}$ chamber of the auxiliary cell and (b) means for transferring at least a portion of electrolyte 2 which exits the $-^{ve}$ chamber of the auxiliary cell into electrolyte 1.

* * * * *